(12) United States Patent
Graham

(10) Patent No.: US 11,204,754 B2
(45) Date of Patent: Dec. 21, 2021

(54) OPERATING SYSTEM UPDATE

(71) Applicant: HEWLETT-PACKARD DEVELOPMENT COMPANY, L.P., Spring, TX (US)

(72) Inventor: Cristoph J. Graham, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/644,417

(22) PCT Filed: Sep. 7, 2017

(86) PCT No.: PCT/US2017/050511
§ 371 (c)(1),
(2) Date: Mar. 4, 2020

(87) PCT Pub. No.: WO2019/050526
PCT Pub. Date: Mar. 14, 2019

(65) Prior Publication Data
US 2020/0201618 A1    Jun. 25, 2020

(51) Int. Cl.
*G06F 9/445* (2018.01)
*G06F 8/65* (2018.01)
*G06F 8/61* (2018.01)
*G06F 9/54* (2006.01)

(52) U.S. Cl.
CPC ............... *G06F 8/65* (2013.01); *G06F 8/61* (2013.01); *G06F 9/54* (2013.01)

(58) Field of Classification Search
CPC .............. G06F 8/65; G06F 8/61; G06F 9/54
USPC .................................................. 717/168–172
See application file for complete search history.

(56) References Cited

U.S. PATENT DOCUMENTS

| | | |
|---|---|---|
| 5,155,847 A | 10/1992 | Kirouac |
| 6,353,926 B1 | 3/2002 | Parthesarathy |
| 7,546,596 B2 | 6/2009 | Needham |
| 7,818,736 B2 | 10/2010 | Appavoo et al. |
| 9,170,803 B2 | 10/2015 | Pavik et al. |
| 9,569,195 B2 | 2/2017 | Schekochokhin et al. |
| 9,626,180 B2 | 4/2017 | Barrat et al. |
| 2008/0209413 A1 | 8/2008 | Kakumani |
| 2014/0053145 A1 | 2/2014 | Steigleder |
| 2016/0092202 A1 | 3/2016 | Filali-Adib |
| 2017/0329593 A1* | 11/2017 | McMullen .......... G06F 11/1451 |

FOREIGN PATENT DOCUMENTS

WO   WO-2013078951 A1   6/2013

OTHER PUBLICATIONS

Non-disruptive Aix Live Updates Are Here, Nov. 2015, http://www.ibmsystemsmag.com/aix/administrator/systemsmanagement/aix-live-updates/.

* cited by examiner

*Primary Examiner* — Chuck O Kendall
(74) *Attorney, Agent, or Firm* — Brooks Cameron & Huebsch PLLC

(57) ABSTRACT

Example implementations relate to an operating system update. An example controller can detect initialization of an update installation to an operating system, initiate an overlay area, track update changes associated with the update installation in the overlay area, save the changes to the overlay area, and apply the saved changes as a package in an update to the operating system.

14 Claims, 3 Drawing Sheets

OPERATING SYSTEM UPDATE

BACKGROUND

An operating system (OS) is system software that manages computer hardware and software resources and provides services for computer programs. Computer programs, excluding firmware, may require an OS to function. An OS can be updated periodically and/or regularly, and the OS update can include an update and/or patch that fixes problems in the OS or in applications and programs associated with the OS.

DETAILED DESCRIPTION

Figure 1:
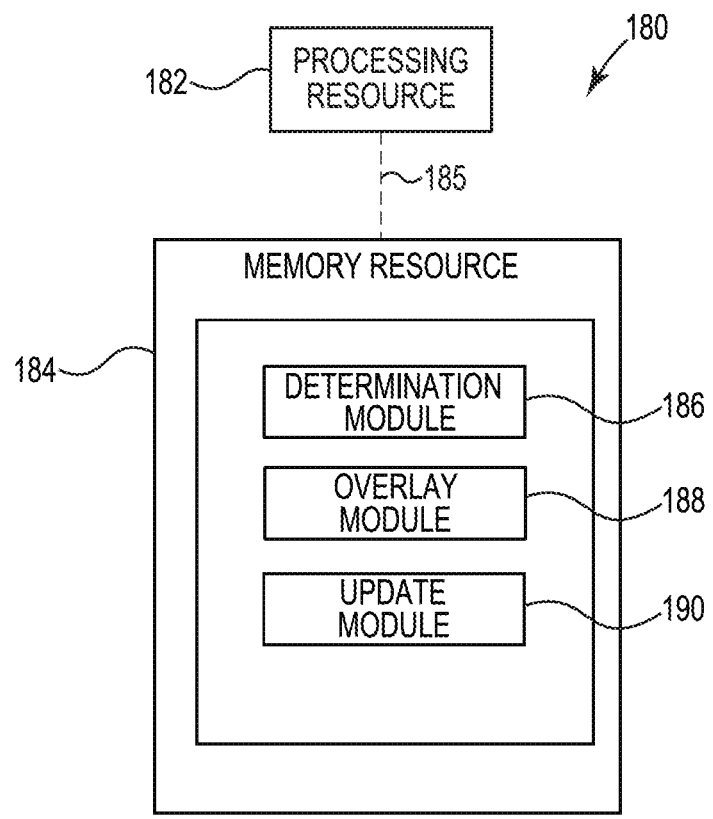
FIG. 1 illustrates a diagram of a computing system including a processing resource, a memory resource, and a number of modules according to an example.

An OS, such as a Microsoft Windows OS, can be large and complicated. An OS can continue to grow in complexity due to the addition of services while supporting legacy ecosystems and application programming interfaces (APIs). Managing updates for components and services that make up an OS installation can challenging, as updates (e.g., patches) increase in size because of the myriad of components and their interdependencies associated with an OS. An OS update process can be disruptive and time-consuming for a user, such as an end user of a computing device, computing system, or device without a dedicated user intended to operate in an interrupted manner (e.g., airport kiosk). Other example OSes can include a Linux OS, an Apple OS, and a Chrome OS, among others. Examples of the present disclosure are not limited to the aforementioned OSes.

OS application and OSes updates can be large, and can also be structured as executable instructions. Components, services, and applications associated with the OS can be interconnected with each other through an API model and can depend on other components, services, and applications to run successfully. Some approaches to managing these updates can include providing APIs and installation frameworks, but may result in a disruptive experience for a user because the APIs and installation frameworks may operate in a same context as the user and applications they may be executing. This may result in restrictions on how applications and services install or update themselves, particularly if a component may not update itself if the component is in use within the OS. For instance, in an example of a Windows OS, a user may be forced to enter a "servicing mode" where the OS system restarts and executes installation code in a context where no other applications are running.

Other approaches to updating an OS can include providing a plurality of copies of an OS stored on a physical storage device. In such an approach, a first OS can be active, such that the user is actively using the OS, and second OS can be used as a staging area for OS updates. Such an approach may require a large amount of storage to maintain a first and a second OS, especially when the first and the second OSes are of a particular size (e.g., a size comparable to a Microsoft Windows OS size), and the approach may not be cost effective.

Other approaches to updating an OS can include applying differences between one OS update and the next, but such approaches may require updates to be applied in a specific order, and updates may be challenging to manage over a plurality of generations of updates, among other challenges. Another approach to updating an OS can include removing control of the host OS from the user by providing a virtualized desktop or virtualized applications, but may not update an operating environment that is being used to connect to a virtualized service.

Examples of the present disclosure can reduce and/or remove intrusion and disruption of an OS update from a user's view. For instance, in some examples, issues associated with an OS update can be reduced by running an update and/or installation process as a background task and reducing and/or removing modes in which the OS runs a single context to perform updates to components (e.g., a servicing mode). For instance, some examples of the present disclosure can reduce and/or remove interdependencies of system files and configuration data using an overlay area. An OS update can be applied as a single package, in some examples.

FIG. 1 illustrates a diagram of a computing system 180 including a processing resource 182, a memory resource 184, and a number of modules 186, 188, 190, according to an example. The computing system 180 can utilize instructions (e.g., software and/or firmware) hardware, and/or logic to perform a number of functions including those described herein. The computing system 180 can be a combination of hardware and program instructions configured to share information. The hardware, for example, can include a processing resource 182 and/or a memory resource 184 (e.g., computer readable medium (CRM), machine readable medium (MRM), etc., database, etc.).

A processing resource 182, as used herein, can include a processor capable of executing instructions stored by a memory resource 184. Processing resource 182 can be implemented in a single device or distributed across multiple devices. The program instructions (e.g., machine-readable instructions (MRI)) can include instructions stored on the memory resource 184 and executable by the processing resource 182 to implement a desired function (e.g., updating an OS).

The memory resource 184 can be in communication with a processing resource 182. A memory resource 184, as used herein, can include memory components capable of storing instructions that can be executed by processing resource 182. Such memory resource 184 can be a non-transitory CRM or MRM. Memory resource 184 can be integrated in a single device or distributed across multiple devices. Further, memory resource 184 can be fully or partially integrated in the same device as processing resource 182 or it can be separate but accessible to that device and processing resource 182. Thus, it is noted that the computing system 180 can be implemented on a participant device, on a server device, on a collection of server devices, and/or a combination of the user device and the server device.

The memory resource 184 can be in communication with the processing resource 182 via a communication link (e.g., a path) 185. The communication link 185 can be local or remote to a machine (e.g., a computing system) associated with the processing resource 182. Examples of a local communication link 185 can include an electronic bus internal to a machine (e.g., a computing system) where the memory resource 184 is one of volatile, non-volatile, fixed, and/or removable storage medium in communication with the processing resource 182 via the electronic bus.

A module and/or modules 186, 188, 190 can include MRI that when executed by the processing resource 182 can perform a number of functions including those described herein. The number of modules 186, 188, 190 can be sub-modules of other modules. For example, the determination module 186 and the overlay module 188 can be sub-modules and/or contained within the same computing system. In another example, the number of modules 186, 188, 190 can comprise individual modules at separate and distinct locations (e.g., MRM, etc.).

Each of the number of modules 186, 188, 190 can include instructions that when executed by the processing resource 182 can function as a corresponding engine. For example, the overlay module 188 can include instructions that when executed by the processing resource 182 can function as an overlay engine, such as overlay engine 236 illustrated in FIG. 2. Similar, each of the modules 186 and 190 can include instructions that when executed by the processing resource 182 can function as engines.

In some examples, engines can be part of a system (not illustrated in FIG. 1) including a database, a subsystem, and the number of engines. The subsystem can include the number of engines in communication with the database via a communication link (e.g., link 285 as referenced in FIG. 2). The system can represent instructions and/or hardware of a network controller (e.g., controller 230 as referenced in FIG. 2, etc.).

The number of engines can include a combination of hardware and programming to perform functions including those described herein. The instructions can include instructions (e.g., software, firmware, etc.) stored in a memory resource (e.g., CRM, MRM, etc.) as well as hard-wired program (e.g., logic).

In some examples, the number of modules 186, 188, 190 can be used in a software-as-a-service delivery model. For instance, components of computing system 180 can exist in a single computing system or multiple computing systems (e.g., distributed). For example, a web server or other computing system that is trusted by the user can provide services to a server of individual data streams, and/or act on behalf of the user as a processing agent for recovery.

During an OS update, a computing system may undergo a plurality of phases including normal operation, update preconfiguration, update installation, servicing mode, update postconfiguration, and a return to normal operation. Each phase can represent a set of actions that occur and impact a user experience. For instance, during normal operation, a user can perform tasks and execute applications, and updates can be downloaded in the background automatically or at the user's request. As another example, an update preconfiguration phase can include unpacking and preparation of updates to be performed on a particular computing system In some examples of the present disclosure, determination module 186 can include instructions that when executed by the processing resource 182 can cause a computing system to determine a plurality of updates to be made to a plurality of files of an OS. For instance, an update agent can be monitored to determine what updates need to be made to the OS. In some examples, monitoring can include monitoring the OS for the initialization of an update installation phase using an OS API to track execution of services. An update installation phase can include updates triggered and executed as part of installation APIs. The plurality of updates can include a change to a file system associated with the OS and/or a change to a system registry associated with the OS.

For instance, read access can be provided to original contents of the computing system running the OS, allowing for updates to use their internal instruction sets to determine how and what components should be updated. In some examples, transactions associated with the update process itself, or any child processes that the update process can create and execute can be redirected to an overlay area, which will be discussed further herein. For instance, transactions not associated with the OS update process may not be moved to the overlay area. Put another way, updates can be made to the file system and OS configuration, but the file system and OS configuration may not be modified or recompiled. The file system and OS configuration may be unaware that there is a behavioral change within the OS environment.

Overlay module 188 can include instructions that when executed by the processing resource 182 can cause a computing system to save the plurality of updates to an overlay area while one of the plurality of files is running on the OS. For instance, a user can be using a file without disruption while updates to be made to that file are being saved to the overlay area.

As used herein, an overlay area can include an area responsible for files and configuration data belonging to the OS. For instance, overlaying can include transferring a block of data into the overlay area, and in some examples, the transferred block of data can replace what was previously stored in the overlay area. The overlay area, in some instances, can include a hierarchical overlay database (e.g., a registry). In some examples, overlay module 188 can include instructions executable to save the plurality of updates to the overlay area in response to completion of installation calculations associated with each of the plurality of updates. For instance, as updates are made by performing file system operations and/or by making changes to a system registry, those changes can be written to the overlay area. That is, changes that have already been calculated can be applied as part of a package update, as will be discussed further herein.

Execution and processing of the updates can take place as a background task while a user continues to use the OS without interruption. The updates, in some instances, can include instructions intended to be carried out during a servicing-type mode. For example, because content is being copied to an overlay, such a mode can be started as a background task. In some instances, an overlay area (and its layout) can be designed using information associated with file locations on an original drive and update information.

In some examples, a request to restart the OS can be overridden by capturing an API request and/or refusing the OS restart request at a driver or service event layer of the OS. Put another way, an overlay area can be an area where shadow copies of update information can be stored. For instance, the shadow copy can be temporarily stored in the overlay area.

The instructions that have been recorded into the overlay area can be executed as a background task. As used herein, a background task can include an operation that is hidden with limited obtrusion to a user of the computing system and limited user experience compromise. For instance, a background task runs behind the scenes (e.g., in the background) and without user intervention. In some examples, all of the instructions that have been recorded into the overlay area can be executed.

During update postconfiguration, which can include final stages of an update process including cleanup activities associated with the updates and personalization of the updates to a user's specific environment and OS configuration, read operations can be redirected to the overlay area and additional changes to the overlay area can be recorded.

Update module 190 can include instructions that when executed by the processing resource 182 can cause a computing system to apply the plurality of saved updates to the OS in a single operation. For instance, contents of the overlay area can be saved as a package that can be applied as a single update during an OS restart. The package update can result in the updates being installed and configured while the user experienced limited or no disruptions or interruptions.

In some examples, system 180 can include a meter module (not illustrated in FIG. 1) including instructions that when executed by the processing resource 182 can cause a computing system to meter an amount of resources used by the processing resource while the plurality of updates are saved to the overlay area. For instance, because some processing resources (e.g., central processing resources) may be used for updating the OS, the processing resources used during the OS update can be metered, such that a threshold amount of processing resources (e.g., 10 percent) may be used for the OS update. Said another way, a limit on the amount of resources that can be used during the OS update can be set, which can reduce interruptions to the user and/or limit user experience compromises. For instance, the update can be transparent or non-distinguishable from a user's normal activity, in some examples.

Figure 2:
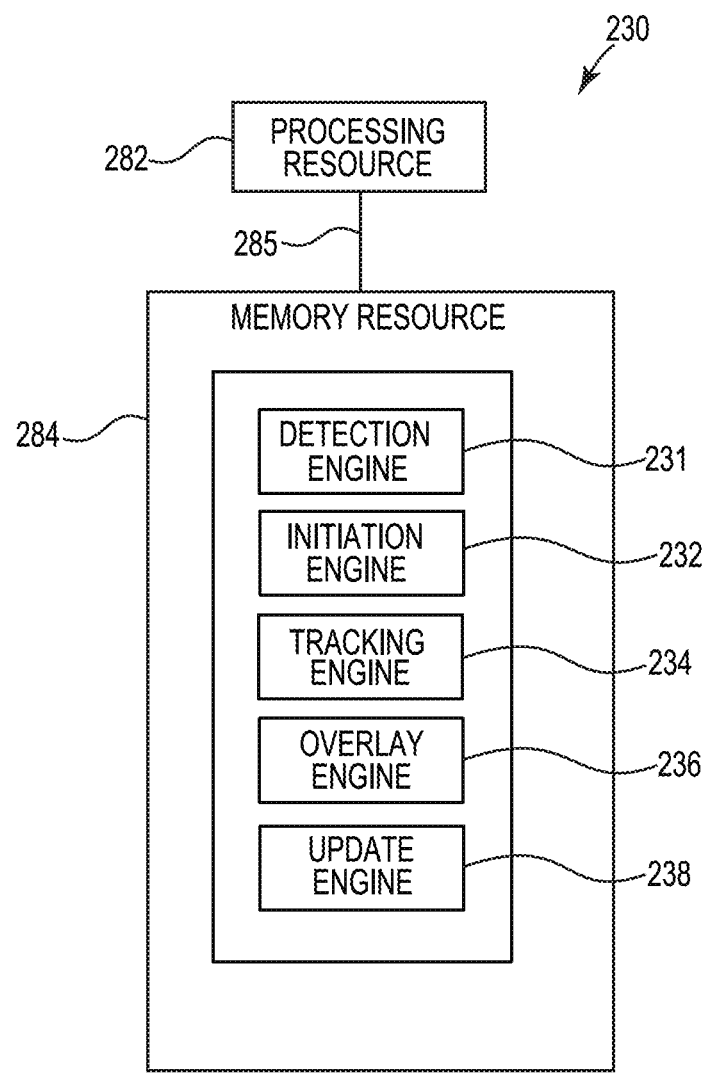
FIG. 2 illustrates a diagram of a controller including a processing resource, a memory resource, and an engine according to an example.

FIG. 2 illustrates a diagram of an example controller 230 including a processing resource 282, a memory resource 284, and an plurality of engines 231, 232, 234, 236, 238 according to an example. For example, the controller 230 can be a combination of hardware and instructions for updating an OS. The hardware, for example can include a processing resource 282 and/or a memory resource 284 (e.g., MRM, CRM, data store, etc.).

The processing resource 282, as used herein, can include a number of processors capable of executing instructions stored by a memory resource 284. The instructions (e.g., MRI) can include instructions stored on the memory resource 284 and executable by the processing resource 282 to implement a desired function (e.g., update an OS). The memory resource 284, as used herein, can include a number of memory components capable of storing non-transitory instructions that can be executed by processing resource 282. Memory resource 284 can be integrated in a single device or distributed across multiple devices. Further, memory resource 284 can be fully or partially integrated in the same device as processing resource 282 or it can be separate but accessible to that device and processing resource 282. Thus, it is noted that the controller 230 can be implemented on an electronic device and/or a collection of electronic devices, among other possibilities.

The memory resource 284 can be in communication with the processing resource 282 via a communication link (e.g., path) 285. The communication link 285 can be local or remote to an electronic device associated with the processing resource 282. The memory resource 284 includes engines (e.g., detection engine 231, initiation engine 232, tracking engine 234, overlay engine 236, update engine 238). The memory resource 284 can include more engines than illustrated to perform the various functions described herein.

The engines 231, 232, 234, 236, 238 can include a combination of hardware and instructions to perform a number of functions described herein (e.g., update an OS). The instructions (e.g., software, firmware, etc.) can be downloaded and stored in a memory resource (e.g., MRM) as well as a hard-wired program (e.g., logic), among other possibilities.

The detection engine 231 can detect initialization of an update installation to an OS. For instance, the OS can be monitored for the initialization of an update installation phase using OS APIs to track execution of services. An update installation phase can include OS updates being triggered and executed as a part of application installation APIs. OS updates can query a system configuration and make assessments about which files and configuration options may need to be modified. An update installation phase can also include installing or replacing files and updating system registry configuration data to reflect installation components of each update.

The initiation engine 232 can initiate an overlay area, and the tracking engine 234 can track update changes associated with the update installation in the overlay area. The overlay area can include changes to a file system and a system registry. A write filter can be used to facilitate the overlay area in some examples.

During update installation, which can include OS updates being triggered and executed as part of an application installation API and updates querying a system configuration, read access can be provided to original contents of the computing system allowing OS updates to use their internal instruction sets to determine what components to update and how to update them.

The overlay engine 236 can save the changes to the overlay area. For instance, as changes are made to a system registry, the changes can be saved to the overlay area. Some of the changes can include instructions to be carried out during a servicing-type mode. Update instructions associated with the changes saved to the overlay area can be executed as a background task resulting in limited user experience compromise.

In some examples, the controller can include instructions executable to override a request to restart the OS by capturing an API request at a particular layer (e.g., event layer) of the OS and/or by refusing a system restart at a particular layer of the OS. For instance, such a refusal can prevent the OS from entering a single operating mode for updating (e.g., servicing mode). During an update postconfiguration phase of the OS update, read operations can be redirected to the overlay area, and additional changes can be saved to the overlay area.

The update engine 238 can apply the saved changes as a package in an update to the OS. For instance, contents of the overlay area can be saved as a package, and the saved changes can be applied as the package during a restart of the OS. Subsequent to the restart, OS updates may be considered installed and configured. Because they were performed as a background task, the user may not experience interruptions or disruptions during the OS update.

Figure 3:
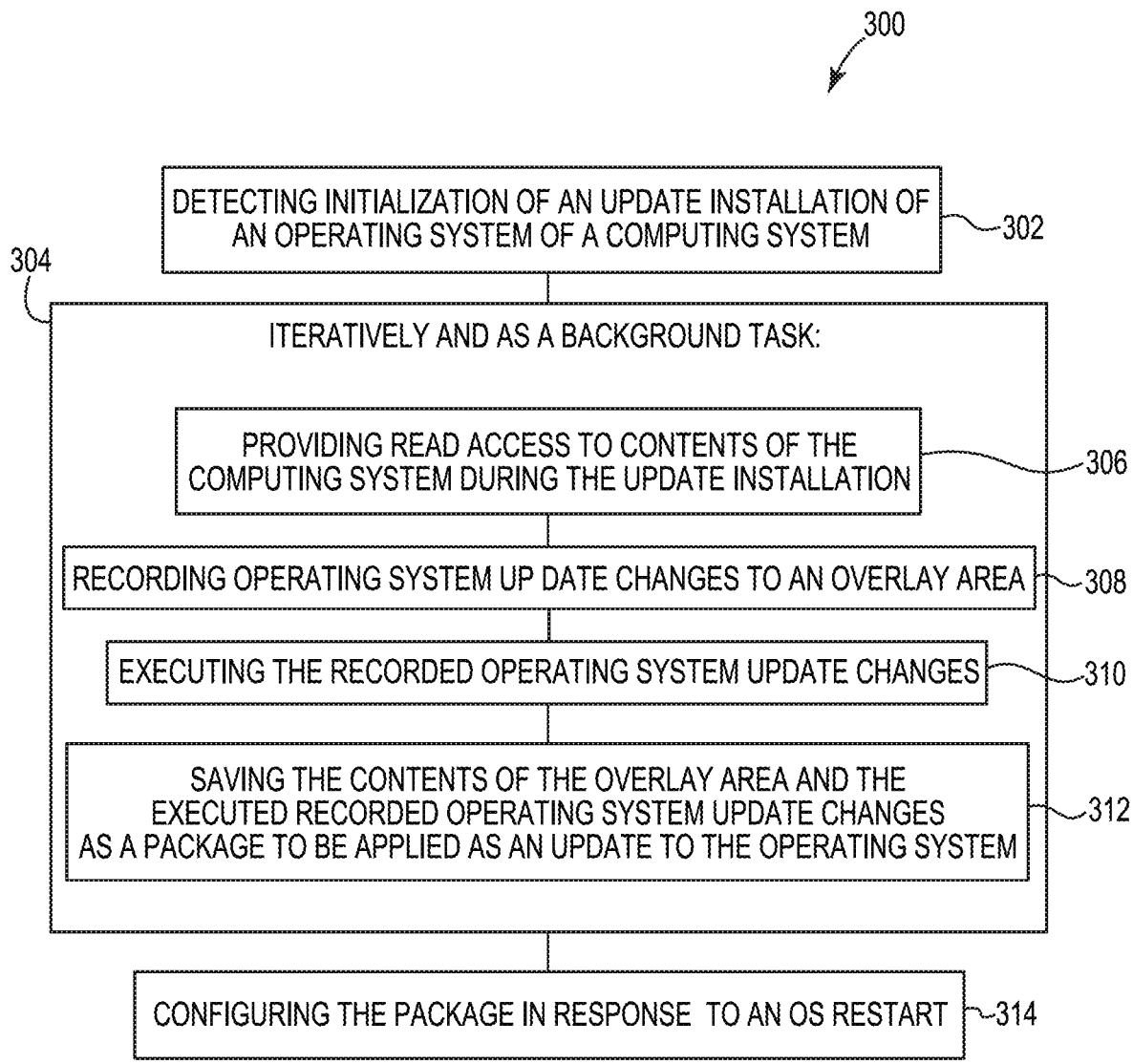
FIG. 3 illustrates a diagram of a method for an OS update according to an example.

FIG. 3 illustrates a diagram of a method 300 for an OS update according to an example. At 302, method 300 can include detecting initialization of an update installation of an OS of a computing system. Detecting initialization of the update installation, in some examples, can include tracking execution of OS services.

At 304, method 300 can include an iterative process run as a background task. For instance, the iterative process can include, at 306, read access being provided to contents of the computing system during the update installation. Providing read access can include, in some examples, allowing an OS update to use an internal instruction set to determine which OS component to update and/or how to update a particular OS component. At 308, the iterative process can include OS update changes to an overlay area being recorded, and at 310, the iterative process can include the recorded OS update changes being executed. In some examples, OS update execution instructions can be executed. Method 300, in some examples, can include redirecting read operations to the overlay area during update postconfiguration. Resulting changes to the overlay area can be recorded.

At 312, the contents of the overlay area and the executed recorded OS update changes as a package can be applied as an update to the OS. For instance, the contents of the overlay area and the executed recorded OS update changes (which can be included in the overlay area) can be saved as a package to be applied as a single OS update during an OS restart. The iterative process can continue until the desired OS updates are ready and the package includes the desired contents for the single OS update.

Method 300, at 314, can include configuring the package in response to an OS restart. Configuring can include, for example, transposing contents of the package (e.g., data that has been changed) into proper locations to mimic an OS update installation's intent. For instance, upon restart completion, a user may not experience screen messages indicating wait times due to updates being performed. Put another way, the user may have limited or no interruptions or disruptions due to the OS update because the OS updates are saved to the overlay area as a background task.

OS updates according to the present disclosure may be used in environments where user interaction for updates may not be preferred, such as kiosks, digital signage, Internet of Things (IoT) devices, etc. For instance, such as environments may not have a time allowance for lengthy, large updates, as users may desire continuous access. For example, an IoT device may include sensors (e.g., security sensors), and such a device may not have time to be down for updates. However, if it is desired to run a large OS, such as a Windows OS on the IoT device, an OS update in accordance with the present disclosure can allow for limited or no interruptions or disruptions for the user due to the OS update.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed:

1. A controller comprising a processing resource in communication with a non-transitory machine-readable medium storing instructions executable by the processing resource to cause a computing system to:
   detect initialization of an update installation to an operating system;
   initiate an overlay area, wherein the overlay area comprises an area responsible for files and configuration data belonging to the operating system;
   track update changes associated with the update installation in the overlay area;
   override a request to restart the operating system by capturing an application programming interface request at a particular layer of the operating system;
   save the changes to the overlay area including changes to a file system and system registry;
   redirect read operations to the overlay area and save additional changes to the file system and the system registry to the overlay area during an update postconfiguration phase of the operating system update installation; and
   apply the saved changes and saved additional changes as a package in an update to the operating system.

2. The controller of claim 1, further comprising instructions executable by the processing resource to cause the computing system to override the request to restart operating system by refusing a system restart at a particular layer of the operating system.

3. The controller of claim 1, further comprising instructions executable by the processing resource to cause the computing system to execute update instructions associated with the changes saved to the overlay area as a background task.

4. The controller of claim 1, wherein the instructions are further executable by the processing resource to cause the computing system to apply the saved changes as a package in an update to the operating system during a restart of the operating system.

5. A non-transitory machine-readable medium storing instructions executable by a processing resource to cause a computing system to:
   determine a plurality of updates to be made to a plurality of files of an operating system;
   detect initialization of an update installation of an operating system of the computing system including the plurality of updates;
   save the plurality of updates to an overlay area including changes to a file system and system registry while one of the plurality of files is running on the operating system,
      wherein the overlay area comprises an area responsible for files and configuration data belonging to the operating system;
   override a request to restart the operating system by capturing an application programming interface request at a particular layer of the operating system;
   redirect read operations to the overlay area and save additional changes to the file system and the system registry to the overlay area during an update postconfiguration phase of the operating system update installation; and
   apply the plurality of saved updates and the saved additional changes to the operating system in a single operation.

6. The medium of claim 5, further comprising instructions executable to save the plurality of updates to the overlay area in response to completion of installation calculations associated with each of the plurality of updates.

7. The medium of claim 5, further comprising instructions executable to meter an amount of resources used by the processing resource while the plurality of updates is saved to the overlay area.

8. A method, comprising:
a non-transitory machine-readable medium storing instructions executable by a processing resource to cause a computing system to:
detect initialization of an update installation of an operating system of a computing system;
iteratively and as a background task:
provide read access to contents of the computing system during the update installation;
record operating system update changes to an overlay area including changes to a file system and system registry,
wherein the overlay area comprises an area responsible for files and configuration data belonging to the operating system;
override a request to restart the operating system by capturing an application programming interface request at a particular layer of the operating system;
execute the recorded operating system update changes;
redirect read operations to the overlay area and recording additional changes to the file system and the system registry to the overlay area during an update postconfiguration phase of the operating system update installation; and
save the contents of the overlay area and the executed recorded operating system update changes as a package to be applied as an update to the operating system; and
configure the package in response to an operating system restart.

9. The method of claim 8, wherein the instructions executable by the processing resource to cause the computing system to execute the recorded operating system update changes comprises the instructions executable by the processing resource to cause the computing system to execute operating system update execution instructions.

10. The method of claim 8, wherein the instructions executable by the processing resource to cause the computing system to detect initialization of the update installation comprises the instructions executable by the processing resource to cause the computing system to track execution of operating system services.

11. The method of claim 8, wherein the instructions executable by the processing resource to cause the computing system to provide read access comprises the instructions executable by the processing resource to cause the computing system to allow an operating system update to use an internal instruction set to determine which operating system component to update.

12. The method of claim 8, wherein the instructions executable by the processing resource to cause the computing system to provide read access comprises the instructions executable by the processing resource to cause the computing system to allow an operating system update to use an internal instruction set to determine how to update a particular operating system component.

13. The medium of claim 5, wherein the instructions are executable to save the plurality of updates, override the request, redirect the read operations and save the additional changes, and apply the plurality of saved updates and the saved additional changes iteratively and as a background task.

14. The controller of claim 1, wherein the instructions are executable by the processing resource to cause the computing system to track the changes, override the request, save the changes, redirect the read operations and save the additional changes, and apply the saved changes and the saved additional changes iteratively and as a background task.

* * * * *